Figure 4:
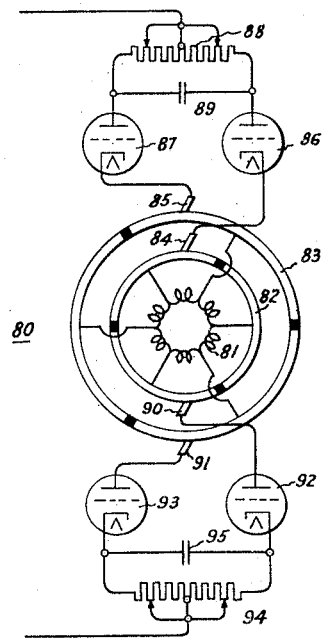

Feb. 11, 1941.        W. F. WESTENDORP         2,231,607
                     DYNAMOELECTRIC MACHINE
                      Filed Feb. 1, 1939         2 Sheets-Sheet 1
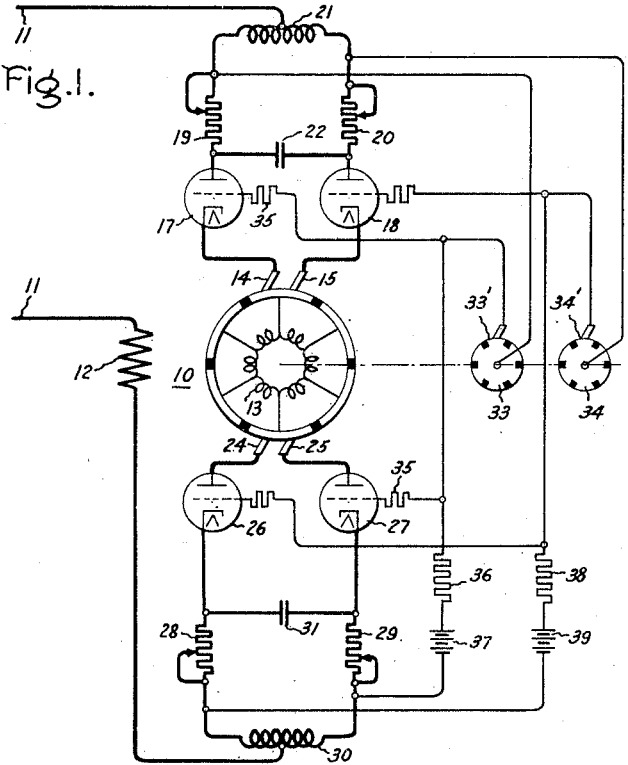
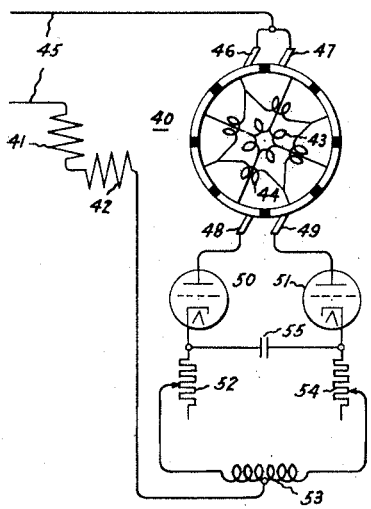
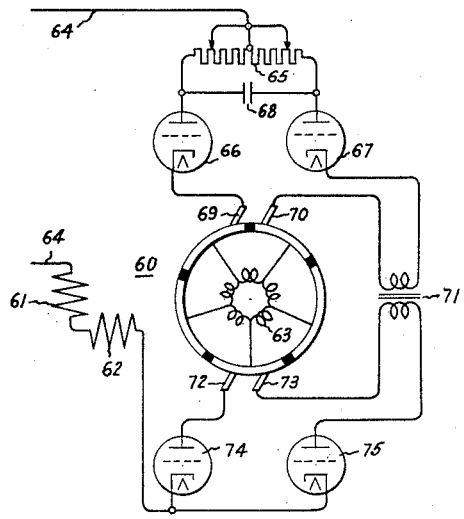
Inventor:
Willem F Westendorp,
by Harry E. Dunham
His Attorney.

Inventor:
Willem F Westendorp,
by Harry E. Dunham
His Attorney.

Patented Feb. 11, 1941

2,231,607

UNITED STATES PATENT OFFICE 2,231,607

DYNAMOELECTRIC MACHINE

Willem F. Westendorp, Schenectady, N. Y., assignor to General Electric Company, a corporation of New York Application February 1, 1939, Serial No. 254,082

8 Claims. (Cl. 171—228)

My invention relates to direct current dynamoelectric machines, and more particularly to such machines operating in conjunction with a plurality of electric valves.

Heretofore it has been well known that one of the chief limitations in the design of dynamoelectric machines of the direct current or commutator type is the difficulty encountered in the design of commutators adapted to operate on high current density and particularly on high voltage. It has previously been suggested that certain of these limitations may be overcome by utilizing a plurality of electric valves to perform the commutation between different portions of the windings of such machines. Such arrangements in tthe past, however, have had the disadvantage of requiring a large number of valves together with a large number of slip rings of commutator segments. In accordance with my invention the number of commutator segments and the number of valves may be reduced to a very small number.

It is, therefore, an object of my invention to provide an improved and simplified arrangement utilizing a plurality of electric valves together with a dynamoelectric machine of the commutator or direct current type for operation either as a generator or motor in conjunction with a high voltage direct current circuit.

For a better understanding of my invention, together with other and further objects thereof, reference is had to the following description taken in connection with the accompanying drawings, and its scope will be pointed out in the appended claims. Fig. 1 of the accompanying drawings illustrates one arrangement for operating a direct current machine from a direct current circuit, and Figs. 2, 3, 4 and 5 show various modifications of my invention.

Referring now to Fig. 1 of the drawings, there is shown a direct current machine 10 operating from a direct current circuit 11. For convenience in explaining the operation of the system it will be assumed that the direct current machine 10 is operating as a motor and that the direct current circuit 11 is a supply circuit. This direct current machine 10 has a conventional field winding 12 and a closed armature winding 13. The armature winding 13 instead of being connected to a large number of small segments of a commutator, such as for example a 72-segment commutator, is connected to a commutator having a small or cardinal number of segments, such as for example six segments so that a relatively high voltage gradient appears between these segments. The segments are separated by insulating segments which are greater in width than the brushes that cooperate with the commutator. A pair of input brushes 14 and 15 is provided which are angularly displaced from each other relative to the armature winding 13. Each of the input brushes 14 and 15 is connected to one of a pair of input valves 17 and 18 which valves may be any of the type commonly utilized in the art, but for simplicity in explanation are shown as being of the type comprising an incandescent cathode, an anode and a control grid. The anodes of the valves 17 and 18 are connected respectively to the adjustable resistors 19 and 20 and through the reactor 21 to one side of the direct current circuit 11. A capacitor 22 is connected between the anodes of these valves in order to provide the necessary commutating voltage for starting the motor. A pair of output brushes 24 and 25 is also provided, the brushes of which are angularly displaced from each other relative to the armature winding 13. The brushes 24 and 25 are connected respectively to the anodes of a pair of valves 26 and 27, the cathodes of which are connected through adjustable resistors 28 and 29 and a reactor 30 to the field winding 12 and the other side of the direct current circuit 11. While a series field excitation has been shown it will be apparent to those skilled in the art that shunt field excitation may be used without departing from my invention. A suitable capacitor 31 is connected between the cathodes of the valves 26 and 27 to supply the commutating potential during operation. In order to control the conductivities of the valves 17, 18, 26 and 27 there are provided two distributors 33 and 34 mounted on the shaft of the motor 10. The conducting segments of the distributors 33 and 34 are connected respectively to opposite terminals of the reactor 21. The distributor 33 is provided with a brush 33' which is connected to the control electrodes of the valves 17 and 27 through suitable current limiting resistors such as 35. This brush is also connected through a resistor 36 to a source of biasing potential 37 which is connected to the cathode side of the valve 27. The distributor 34 is similarly provided with a brush 34' which is connected through suitable current limiting resistors to the control electrodes or grids of the valves 18 and 26 and also through resistor 38 and biasing source of potential 39 to the cathode side of the valve 26.

In explaining the operation of the above described apparatus, it will be assumed that the motor rotor or armature is in the position indicated in the drawings, and that the direction of rotation is counter-clockwise. Under these conditions it is seen that the valves 17 and 27 have just been rendered conductive due to the positive potential appearing in the grid circuit which potential is obtained from the left-hand terminal of the reactor 21. Current now flows from the upper terminal of the direct current circuit through the left-hand portion of the reactor 21, a portion of the resistor 19, the valve 17, the brush 14, the armature winding 13, the brush 25, the valve 27, a portion of the resistor 29, a portion of the reactor 30, the field winding 12, to the other side of the direct current circuit. After the armature 13 has rotated so that the brushes 15 and 24 have contacted the next successive segment commutating voltages built up by the capacitors 22 and 31 will be sufficient to cause the current to be transferred from the present conducting valves to the remaining valves and these valves are rendered conductive by the control circuit including the distributor 34 which now places a positive potential on the grids of the valves 18 and 26 due to the commutating potential of the capacitor 22. These valves become conductive prior to the time that the brushes 14 and 25 are about to leave the segments with which they are in contact. The speed of the machine may be controlled by varying the amount of the resistors 19, 20, 28 and 29. The operation of the various pairs of valves will readily become apparent to those skilled in the art since the action of the commutating potential provided by the capacitors 22 and 31 in combination with reactors 21 and 30 is analogous to the commutating potential provided by a similar capacitor in the parallel type of inverter.

In Fig. 2 I have shown how a fewer number of electric valves may be utilized with a dynamo-electric machine 40 which has a field winding 41, a commutating winding 42 and two electrically separate armature windings 43 and 44 which windings are coupled together 100 per cent. At alternate angularly separated points these windings 43 and 44 are tapped and connected to successive conductive segments of a commutator. One side of the direct current circuit 45 is connected to a pair of input brushes 46 and 47 which are angularly separated with reference to the armature windings 43 and 44. A pair of output brushes 48 and 49, also angularly separated with respect to the armature winding, are connected respectively to the anodes of a pair of valves 50 and 51. The cathode of the valve 50 is connected through an adjustable resistor 52 and a portion of an inductor 53 through the commutating winding 42 and the field winding 41 to the other side of the direct current circuit 45. Similarly the cathode of the valve 51 is connected through an adjustable resistor 54, the other portion of the reactor 53, the commutating winding 42, the field winding 41 to the other side of the direct current circuit 45. A capacitor 55 is connected between the cathodes of the valves 50 and 51 in order to provide the commutating potential during operation. The control circuit for the electric valves 50 and 51 has not been shown since it will be observed that the operation of these valves corresponds to the operation of the valves 26 and 27 of Fig. 1 and that they are alternately rendered conductive in accordance with the positions of the brushes 48 and 49 relative to the conducting segments of the commutator. It will be apparent that in operation when the brushes 46 and 48 are conducting current and brushes 47 and 48 are the next ones to follow in conducting current that current may be readily interrupted through the brushes 46 and 49 by transferring the current from valve 51 to valve 50 since the brushes 46 and 47 are connected to electrically separate armature windings.

In Fig. 3 I have shown the manner in which two pairs of valves may be utilized with a dynamo-electric machine 60 having a field winding 61, a commutating winding 62 and a closed armature winding 63. This closed armature winding 63 is connected to an odd number of commutator segments which permit the elimination of the commutating capacitor in connection with the second pair of valves and the elimination of the reactors. Thus, one side of the direct current circuit 64 is connected to an intermediate point on an adjustable resistor 65 the outer extremities of which are connected respectively to the anodes of a pair of valves 66 and 67. A suitable commutating capacitor 68 is connected between the anodes of these valves. A pair of input brushes 69 and 70 which are angularly displaced relative to the armature winding 63 are connected so that the one brush 69 is connected directly to the cathode of the valve 66 and the other brush 70 is connected through a transformer 71 to the cathode of the valve 67. A pair of output brushes 72 and 73 which are angularly displaced relative to the armature winding 63 are connected so that the one brush 72 is connected directly to the anode of an electric valve 74 whereas the other brush 73 is connected through one winding of the transformer 71 to the anode of the electric valve 75. The cathodes of the valves 74 and 75 are connected through the commutating winding 62 and the field winding 61 to the other side of the direct current circuit 64. From an examination of the circuit arrangement shown in Fig. 3 it will become apparent to those skilled in the art that the action of the commutating capacitor 68 is such as to transfer the current from one valve to another between the valves 66 and 67. Since the cathode of the valve 67 is connected through one winding of the transformer 71 to its brush 70 it furthermore will be apparent that the transformer 71 reflects the action of these commutating capacitors to the valves 74 and 75 since the valve 75 has its anode connected to one winding of the transformer 71. At the higher operating speeds, however, the commutating winding 62 serves to supply the necessary voltage for transferring the current between the valves of the two pairs of valves.

At the higher operating speeds the resistor 65, and capacitor 68 may be short circuited, commutation is generated by the commutating winding 62 which acts to produce a commutating voltage in the armature 63. This commutating voltage then causes current to be transferred, for instance in the position shown, from valve 66 to valve 67 and by means of a transformer 71 the current is also transferred between the valves 74 and 75. It may then be assumed that the valve 67 and 75 are conductive. During the next operation the brushes 72 and 73 will each be on different segments thereby receiving a commutating voltage directly from the armature 63 which will cause the current to transfer from valve 75 to valve 74 and again the transformer 71 becomes effective to cause the transfer of current between the valves 66 and 67. From this it will be apparent that at any one instant the valves 66 and 74 are simultaneously conductive and the valves 67 and 75 are simultaneously nonconductive. In the next cycle of operation the valves 67 and 75 are carrying current whereas the valves 66 and 74 are nonconductive.

While in Fig. 2 a series field excitation obtained from the field winding 41 and a commutating voltage obtained from the commutating winding 42 has been shown, and similarly series field excitation and commutating potentials have been shown as being provided by the windings 61 and 62, it will be apparent to those skilled in the art that a shunt field excitation may be utilized. Furthermore, instead of obtaining commutation from winding 42 in Fig. 2 and winding 62 in Fig. 3 commutation may be obtained by shifting the position of the brushes which cooperate with the commutator means.

In the arrangement shown in Fig. 4 the dynamoelectric machine 80 may be assumed to have field windings and commutating windings similar to the machine shown in Fig. 3, although these are not shown. The armature winding 81 is divided into an even number of portions half of which are connected to one armature ring 82 and the alternate portions of which are connected to another armature ring 83. A pair of input brushes 84 and 85 cooperate with the armature rings or distributors 82 and 83, respectively, and these brushes are connected respectively through the valves 86 and 87 to an adjustable resistor 88, the midpoint of which is connected to one side of the direct current circuit. A suitable commutating capacitor 89 is connected between the anodes of the valves 86 and 87. A pair of output brushes 90 and 91 cooperate with the distributors 82 and 83, respectively, and these brushes are connected through the valves 92 and 93, respectively, to an adjustable resistor 94, the midpoint of which is connected to the other side of the direct current circuit. A suitable commutating capacitor 95 is connected between the cathodes of the valves 92 and 93. At normal operating speed the valves 87 and 92 will be conductive at one instant and at a following cycle the valves 86 and 93 will be conductive. In this arrangement there is always an armature coil or portion of the armature winding 81 connected between the input brushes and the output brushes. Thus commutation at the higher speeds with the adjustable resistors 88 and 94 short circuited together with the commutating capacitors 89 and 95 will be obtained because of the electromotive force induced in the various portions of the armature winding 81. These voltages will cause the transfer of current to occur between the various valves of each pair of valves.

Figure 5:
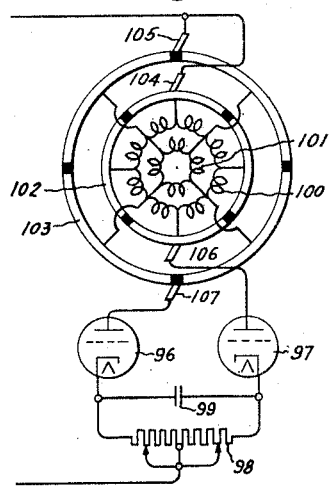

The arrangement shown in Fig. 5 shows how the machine may be provided to operate with a minimum of equipment including a pair of electric valves 96 and 97 the cathodes of which are connected to an adjustable resistor 98, the midpoint of which is connected to one side of the direct current circuit. A suitable commutating capacitor is connected between the cathodes of the valves 96 and 97. Two windings 100 per cent magnetically coupled, similar to the windings shown in Fig. 2, are utilized. These windings 100 and 101, respectively, are connected to separate commutator arrangements 102 and 103. A pair of input brushes 104 and 105 cooperate with these commutators. A pair of output brushes 106 and 107 also cooperate with the commutators 102 and 103, respectively, and these brushes are connected to the anodes of the valves 97 and 96, respectively. Commutation at the higher or normal operating speeds occurs because that portion of the armature winding carrying current has a greater counterelectromotive force than the other winding and hence the proper valves becomes conductive as soon as the grids or control electrodes permit them to become conductive.

While there have been shown and described particular embodiments of my invention, it will be obvious to those skilled in the art that various changes and modifications can be made thereon without departing from my invention and I aim, therefore, in the appended claims to cover all such changes and modifications as fall within the true spirit and scope of my invention.

What I claim as new and desire to secure by Letters Patent of the United States is:

1. The combination of a direct current circuit, a motor having a commutator and a closed armature winding, said commutator comprising a small number of insulating segments and conductive segments, said conductive segments being connected to said armature winding so as to have relatively high voltage gradients therebetween, a plurality of pairs of brushes, each brush having a width less than the width of said insulating segments and each brush of each pair being angularly displaced from the other brush by an amount less than the angular extent of said conducting segments so that both brushes of one pair may simultaneously engage one of said segments, electric valve means interconnecting said brushes with said direct current circuit, means for commutating the current between said valves, and means for controlling the conductivities of said valves in accordance with the speed of said motor.

2. The combination of an electric circuit, a motor having a closed armature winding, a commutator comprising a small number of insulating segments and conductive segments, successive ones of said conductive segments being connected to successive circumferentially spaced points of said armature winding, a pair of input brushes, each brush being angularly displaced from the other, a pair of output brushes, each brush thereof being angularly displaced from the other, electric valve means interconnecting said brushes with said direct current circuit, means for commutating the current between said valves, and means for controlling the conductivities of said valves in accordance with the angular positions of the conductive segments relative to said pairs of brushes.

3. The combination of a direct current circuit, a motor having a closed armature winding, commutator means comprising a small number of insulating segments and conductive segments, means connecting said conductive segments to successive circumferentially spaced points on said armature winding so as to produce relatively high voltage gradients between said segments, a plurality of pairs of brushes, each brush of each pair being angularly displaced from the other brush of said pair, said brushes having a width less than the width of said insulating segments, electric valve means interconnecting said brushes with said direct current circuit, means for commutating the current between said valves, and means for controlling the conductivities of said valves in accordance with the angular positions of said conductive segments relative to said brushes.

4. The combination comprising a direct current circuit, a motor having a closed armature winding, a commutator having an even number of conductive segments and a like number of insulating segments, said conductive segments being connected to said armature winding to produce a high voltage gradient across said segment, a pair of input brushes and a pair of output brushes, said brushes each having a width less than the width of said insulating segment, the brushes of each pair being angularly displaced from each other and arranged to engage simultaneously the same conducting segment at intervals during operation of said motor, a plurality of electric valves associated with said direct current circuit for controlling the flow of current through said brushes, means for commutating the current between the brushes of one pair during the time that said pair engages the same conducting segment, and means responsive to the position of said armature winding for controlling the conductivities of said valves.

5. The combination comprising a direct current circuit, a motor having two closed armature windings closely coupled magnetically, a commutator means having a plurality of conductive segments and insulating segments, said conductive segments being connected to said armature windings to produce a high voltage gradient across said segments, a plurality of sets of brushes cooperating with said commutator means, said brushes being so positioned as to be angularly displaced from each other and from different portions of said armature windings, a plurality of electric valve means for commutating the current from one brush to another prior to the time that said brush leaves a conducting segment, and means responsive to the position of said armature windings relative to said brushes for controlling the conductivity of said valves.

6. The combination comprising a direct current circuit, a motor having two closed armature windings closely coupled magnetically, a commutator having a small number of conductive segments and a like number of insulating segments, alternate conductive segments being connected to one of said armature windings, a pair of input brushes cooperating with said commutator, said brushes being angularly displaced from each other, a pair of output brushes, said brushes being angularly displaced from each other, each of said brushes of each of said pairs of brushes having a width less than the width of said insulating segments, a pair of electric valves associated with said direct current circuit for controlling the flow of current through said pairs of brushes, means responsive to the position of said armature windings relative to said brushes for controlling the conductivities of said valves, and means for commutating the current from one brush to another prior to the time that said brush leaves a conducting segment.

7. The combination comprising a direct current circuit, a motor having a closed armature winding, a commutator having an odd number of conductive segments and a like number of insulating segments, said conductive segments being connected to said armature windings to produce a high voltage gradient across said segment, a pair of input brushes and a pair of output brushes cooperating with said commutator, said brushes each having a width less than the width of said insulating segments and each brush being angularly displaced from the other, said pairs of brushes being arranged diametrically opposite each other, an electric valve for interconnecting each of said brushes with said direct current circuit, means associated with the valves of one of the pairs of said brushes for producing a commutating potential, means interconnecting said pair of valves with the other pair of valves for transferring to said latter pair of valves a commutating potential, and means responsive to the position of said commutator relative to said brushes for controlling the conductivities of said valves.

8. The combination comprising a direct current circuit, a motor having two closed armature windings closely coupled magnetically, two commutator means each having a plurality of conductive segments and insulating segments, said conductive segments being connected to said armature windings to produce high voltage gradients across said segments, a plurality of sets of brushes cooperating with said commutator means, said brushes being electrically displaced from each other and from different portions of said armature windings, a plurality of electric valve means for commutating the current from one brush to another prior to the time that said brush leaves the conducting segments, and means responsive to the position of said armature windings relative to said brushes for controlling the conductivities of said valves.

WILLEM F. WESTENDORP.